US 7,907,517 B2

(12) United States Patent
Steven

(10) Patent No.: US 7,907,517 B2
(45) Date of Patent: *Mar. 15, 2011

(54) ROUTING PROTOCOLS WITH PREDICTED OUTAGE NOTIFICATION

(75) Inventor: Bellovin M. Steven, Westfield, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/788,006

(22) Filed: May 26, 2010

(65) Prior Publication Data

US 2010/0232445 A1 Sep. 16, 2010

Related U.S. Application Data

(63) Continuation of application No. 10/742,567, filed on Dec. 19, 2003, now Pat. No. 7,756,008.

(51) Int. Cl.
*H04L 12/26* (2006.01)
(52) U.S. Cl. ......... 370/216; 370/237; 370/238; 370/254
(58) Field of Classification Search .................. None
See application file for complete search history.

(56) References Cited

U.S. PATENT DOCUMENTS

| | | | |
|---|---|---|---|
| 5,649,108 A | 7/1997 | Spiegel et al. | |
| 5,825,772 A | 10/1998 | Dobbins et al. | |
| 5,948,069 A | 9/1999 | Kitai et al. | |
| 6,078,953 A | 6/2000 | Vaid et al. | |
| 6,243,838 B1 | 6/2001 | Liu et al. | |
| 6,304,892 B1 | 10/2001 | Bhoj et al. | |
| 6,308,216 B1 | 10/2001 | Goldszmidt et al. | |
| 6,310,858 B1 | 10/2001 | Kano et al. | |
| 6,473,431 B1 | 10/2002 | Perlman et al. | |
| 6,552,997 B1 | 4/2003 | Inoue et al. | |
| 6,625,156 B2 | 9/2003 | Shaio et al. | |
| 6,853,641 B2 | 2/2005 | Lindhorst-Ko et al. | |
| 6,944,273 B2 | 9/2005 | Huna | |
| 7,035,202 B2 | 4/2006 | Callon | |
| 7,069,325 B1 | 6/2006 | Lu et al. | |
| 7,287,081 B1 | 10/2007 | Deboer et al. | |
| 2002/0167898 A1 | 11/2002 | Thang et al. | |
| 2003/0198235 A1 | 10/2003 | Weldon et al. | |
| 2004/0071090 A1 | 4/2004 | Corson et al. | |
| 2005/0114506 A1 | 5/2005 | Harper | |
| 2007/0104105 A1 | 5/2007 | MeLampy et al. | |
| 2007/0189191 A1 | 8/2007 | Ades | |

*Primary Examiner* — Kent Chang
*Assistant Examiner* — German Viana Di Prisco
(74) *Attorney, Agent, or Firm* — Hoffmann & Bacon, LLP

(57) ABSTRACT

A method, system and non-transitory computer-readable medium for the efficient routing of data packets across a plurality of routers when a link is unavailable which includes connecting a plurality of nodes in a network using a plurality of routers having a plurality of links between the routers, informing the routers in the network when one or more of the links in the network will be unavailable at a specified time in the future, recalculating the routing tables to determine the most efficient routing paths when the links in the network become unavailable and, when the time in the future arrives, switching the routers in the network to the new routing tables at the same time.

20 Claims, 2 Drawing Sheets

ROUTING PROTOCOLS WITH PREDICTED OUTAGE NOTIFICATION

This application is a continuation application of application Ser. No. 10/742,567, filed on Dec. 19, 2003 now U.S. Pat. No. 7,756,008, which is incorporated herein in its entirety.

BACKGROUND OF INVENTION

The present invention is a method, system and non-transitory computer-readable medium for changing routing tables with the minimum amount of disruption to signals being transmitted over the network. In particular, the present invention relates to a method for informing routers on a network when a link or links will be unavailable at a future time so that the routing tables can be recalculated in advance.

In an heterogeneous environment, such as networks, a need for connection devices to inter-connect two or more links is essential. In this environment, the router is that device. As it's name implies, the router also serves as a routing switchboard. Routers connect two or more networks and forward data packets between them. A router is connected to at least two networks, commonly two local area networks (LANs) or wide area networks (WANs) or a LAN and its Internet Service Provider's (ISP's) network. The idea of a router is to move traffic in the form of data packets from one area to another as needed instead of having one large network. When data arrives from one of the segments, the router decides, according to it's routing table, the segment to which the data will be forwarded. Even though each of the routers' connections is to one physical network, that one network can connect to other networks through the use of other routers. This way, many networks can interconnect.

A router is actually a special computer which is dedicated to the task of interconnecting networks. It moves information from its source to its destination by selecting the most efficient path. Routing refers to the process of choosing the best path over which to send packets and how to cross multiple physical networks. This is the basis of all Internet communication. Routers are located at gateways (a node on a network where two or more networks connect) and communicate with each other using protocols such as the Border Gateway Protocol (BGP) or the Open Shortest Path First protocol (OSPF). Routers forward data packets between any two hosts using headers (units of information that precede a data object) and forwarding tables to configure the best path for the packets to travel. Routers examine the data destination address, extract the target network address from it, and decide (based on this network address) where to transfer the data.

Routers have two major functions: optimizing the routing paths and switching, i.e., the transport of packets over networks. A router uses a routing algorithm to determine the optimal path to the destination. These algorithms maintain routing tables which contain route information such as destination/next hop association. When a computer wants to send a packet over the net, it formats a packet with the router's physical address and the destination address (protocol address) of the target host. The router searches it's routing tables for the destination host. If there is no entry for the destination host, the router usually drops the packet. If there is an entry for the destination host, the router replaces the physical address with the next hop's address and retransmits the packet. The next hop isn't necessarily the ultimate destination host, it may be another router which performs the same routine again. A packet may "visit" several routers/hosts on its route, each time the physical address of its destination changes.

A router consists of a computer with at least two network interface cards supporting the Internet Protocol (IP). The router receives packets from each interface via a network interface and forwards the received packets to an appropriate output network interface. Received packets have all link layer protocol headers removed, and transmitted packets have a new link protocol header added prior to transmission. The router uses the information held in the network layer header (i.e., IP header) to decide whether to forward each received packet, and which network interface to use to send the packet. Most packets are forwarded based on the packet's IP destination address, along with routing information held within the router in a routing table. After the router determines which path to use, it can proceed with switching the packet. This means it accepts the packet on one interface and forwards it to another interface that is the next hop on the best path to the packet's destination.

The routing and filter tables resemble similar tables in link layer bridges and switches. Except, that instead of specifying link hardware addresses (Media Access Control (MAC) addresses), the router table specifies a network (IP addresses). The routing table lists known IP destination addresses with the appropriate network interface to be used to reach that destination. A default entry may be specified to be used for all addresses not explicitly defined in the table. A filter table may also be used to ensure that unwanted packets are discarded. The filter may be used to deny access to particular protocols or to prevent unauthorized access from remote computers by discarding packets to specified destination addresses.

A variety of metrics can be used to define the best path. Some routing protocols, such as Routing Information Protocol (RIP), use only one metric and that is hop count. And some routing protocols, such as IGRP, use a combination of metrics. The metrics most commonly used by routers are: (1) hop count—the number of routers that a packet must go through to reach its destination; (2) bandwidth—the data capacity of a link; (3) delay—the length of time to move the packet from the source to destination; (4) load—the amount of activity on a network resource; (5) reliability—the error rate of each network link; (6) ticks—the delay on a data link using IBM PC clock ticks; and (7) cost—an arbitrary value assigned by an administrator. The optimal route refers to the ability of the routing protocol to select the best route, or the least expensive route. The best route depends on the metrics and metric weightings used to make the calculation. For example, one routing protocol might use the number of hops and the delay, but might weigh the delay more heavily in the calculation. Thus, a route having more hops and shorter delays may be less expensive than a route having fewer drops and longer delays. Since routing protocols indicate how expensive it is to send a packet through a link, traffic in a network can be redirected by indicating that a certain link is extremely expensive (in terms of delay or bandwidth, for example). This will cause routers to calculate paths around an expensive link even though it is nominally available.

Most routers also have a serial connector known as the "Console Port" to which a terminal (or a modem) may be connected. This port is usually used to control the router configuration when the router is first installed. It may be the only port which is allowed to configure the filter table (used to prevent unauthorized access between the connected networks).

Newer applications, such as real-time gaming and voice-over-IP (VoIP), are much more sensitive to short outages in the network than older applications such as email, File Transfer Protocol (FTP), and Web browsing. Even an interruption of a fraction of a second is noticeable—and annoying—to users. Such interruptions can happen because of link or interface failures on routers. The network self-heals, but this takes a significant amount of time. Accordingly, there is a need for a method that enables a user to anticipate the routing changes in a network caused by the unavailability of a link and to reconfigure the routing tables in advance in order to minimize any disruption of the network.

SUMMARY OF THE INVENTION

In accordance with the present invention, a method, system and non-transitory computer-readable medium is provided for the efficient routing of data packets across a plurality of routers when a link is unavailable. This method includes connecting a plurality of nodes in a network using a plurality of routers having a plurality of links between the routers. In a preferred embodiment, the network includes a network operations center. Data packets can be sent between nodes in the network via a plurality of paths. Each path passes through a different combination of routers and links and each router has a routing table which is recalculated at intervals to provide the most efficient routing paths.

A selected router is informed when one or more of the links in the network will be unavailable at a specified time in the future. This information can be sent as an alarm signal or it can be a signal entered manually by an operator. In a preferred embodiment, the information is sent when the there is a metric change in the routing protocol which indicates that a link is very expensive and causes traffic to bypass the link, effectively taking the link off-line. The selected router then transmits a message to the other routers in the network containing information about the one or more links that will be unavailable at a specified time in the future. In a preferred embodiment, the message relates to a metric change in the routing protocol that will take place at a specified time in the future. Using this information, each router recalculates its routing table to determine the most efficient routing paths at the time in the future when one or more of the links in the network will be unavailable.

Based on the information transmitted by the selected router, the plurality of routers in the network switch to new routing tables at the same time. In a preferred embodiment of the present invention, the time when a link will be unavailable is synchronized using a standard time synchronization protocol. In another embodiment, the selected router is polled by other routers in the network in order to obtain additional information about the unavailability of the link or links. When the time in the future arrives for the link or links to be unavailable, the routers in the network transmit data packets through alternate links which have been calculated by the routing tables. Thus, the unavailable link or links are effectively taken off-line and they can be repaired or maintenance work can be performed on them.

After a predetermined period of time or upon a signal from an operator, the selected router is informed that one or more of the links in the network will be available at a specified time in the future. The selected router then transmits a message to the other routers in the network containing information about the one or more links that will be available at a specified time in the future. In another embodiment, the network includes a network operations center and the selected router transmits the message to the other routers and/or the network operations center. Each router recalculates its routing table to determine the most efficient routing paths at the time in the future when one or more of the links in the network will be available. The network operations center selects the time when the routers are switched to the recalculated routing tables. At the appointed time, the plurality of routers in the network are switched to new routing tables at the same time.

The method of the present invention allows links in a network to be taken off-line and put back on-line with the minimal disturbance to the network. Moreover, the present invention allows the routing tables to be configured in advance and implemented instantaneously when the identified links in the network become unavailable. In a preferred embodiment, the recalculation of the routing tables to account for the unavailability of a link or links is carried out during a scheduled recalculation of the routing tables.

BRIEF DESCRIPTION OF THE FIGURES

Other objects and many attendant features of this invention will be readily appreciated as the invention becomes better understood by reference to the following detailed description when considered in connection with the accompanying drawings wherein.

DETAILED DESCRIPTION OF THE INVENTION

The present invention is a method, system and non-transitory computer-readable medium of notifying routers in a network when links will be unavailable to allow the routing tables to be preconfigured on an efficient and economical basis. This allows newly configured routing tables to be used by the routers as soon as links become unavailable. Previously, routers would only learn that a link was no longer available after the fact. This resulted in disruptions of communications across the network as routing tables were recalculated in order to take into account the new network configuration. Typically, routing tables are recalculated to find the most efficient path from one point in the network to another point. Recalculation is done when there's an indication of a topology change, either locally or by a message from another node. Periodically each router sends a message to the other devices in the network which indicates that they are in a normal operating mode. In a preferred embodiment, if this message isn't received within a predetermined time period, the other devices in the network assume that the router is unavailable and recalculate their routing tables accordingly.

Figure 1:
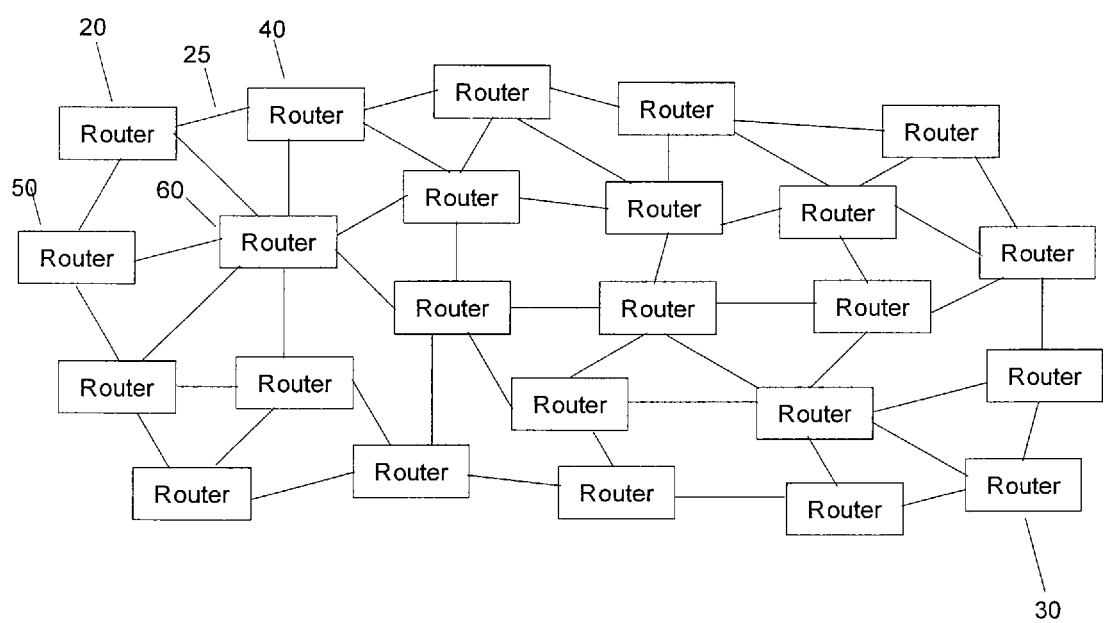
FIG. 1 is a diagram showing a network of routers.

FIG. 1 shows a typical network 10 with a plurality of routers connected by a plurality of links so that information can be transferred from one router in the network 10 to another using a plurality of paths. If one of the links or routers in the network 10 is unavailable, information can still travel between two points in the network 10 using an alternate path. For example, packets of information are being sent from router 20 to router 30 via link 25 and router 40. In the event that either link 25 and/or router 40 are scheduled to become unavailable at some time in the future, a message can be sent by router 40 to the other routers in the network 10 informing them of the scheduled outage. The routers in the network 10 can then calculate new routing tables which will be used in the future and which account for the unavailability of link 25 and/or router 40. When the outage occurs, the routers in the network 10 are switched to the new routing tables and the data packets being sent from router 20 to router 30 are rerouted using new paths through router 50 or router 60 without any significant disruption in network traffic.

A "routing protocol" such as Open Shortest Path First ("OSPF") is the Internet's equivalent of street signs. Assume a world in which no driver knew the way to anywhere past his or her own driveway. When you get to the end of the driveway, you see a sign saying, in effect, "turn right (or left) to see street signs to everywhere." At the corner—the corner is a router—there are signs saying which way to go to get to various destinations. You turn in the appropriate direction; when you get to the next corner, you again look for a sign. If there's no sign, you give up; you're hopelessly lost.

The question is how the sign makers at the corners know what the signs should say. In most Internet routing protocols, the figurative answer is that each group of sign-makers sends a messenger to each neighboring corner (but no further) saying, "Here's a map of the streets leading to my corner, and here are the maps I've gotten from everyone else." From that collection of maps, each group plots the best path and puts up the appropriate street signs.

If the highway department wants to close a road for repair, the messengers can't get through. Eventually, the sign makers at either end of the street figure out that the road is closed, update their local maps, and have their messengers carry the updated maps to their neighbors. But until the updated signs are everywhere, all of the drivers are going to end up going to the closed road and getting lost, because they can only go the way they've been told.

Moving from the metaphorical to the practical, there are often scheduled outages of links and/or routers for maintenance, upgrades, or testing of networks. (For the present application, the term link refers to a line or channel over which data is transmitted.) These outages cause disruptions of traffic until the new topology information has been disseminated to all of the routers in the network. If the new topology information is available in advance, the scope of the disruption is significantly limited. This is important to delay- and jitter-sensitive traffic such as voice or video over IP. (There have been research results indicating that topology changes are one of the main causes of jitter on backbone networks.)

In the present invention, the highway department that manages a network sends out messages in advance saying that, "At 12:03:45 AM on December 1, we're closing this road." The sign makers then create and distribute two maps, one with the current status (road open) and one that will go into effect at 12:03:45 AM on December 1 or, in one embodiment of the present invention, a bit before. Alternatively, the road could actually be closed a few seconds later, to let traffic that was en route finish the drive. It doesn't matter who puts up the roadblocks or how, who takes them down, or when they are taken down. In some sense, it doesn't even matter if the roadblocks go up; once the signs are changed, no traffic is going to drive down that road.

Figure 2:
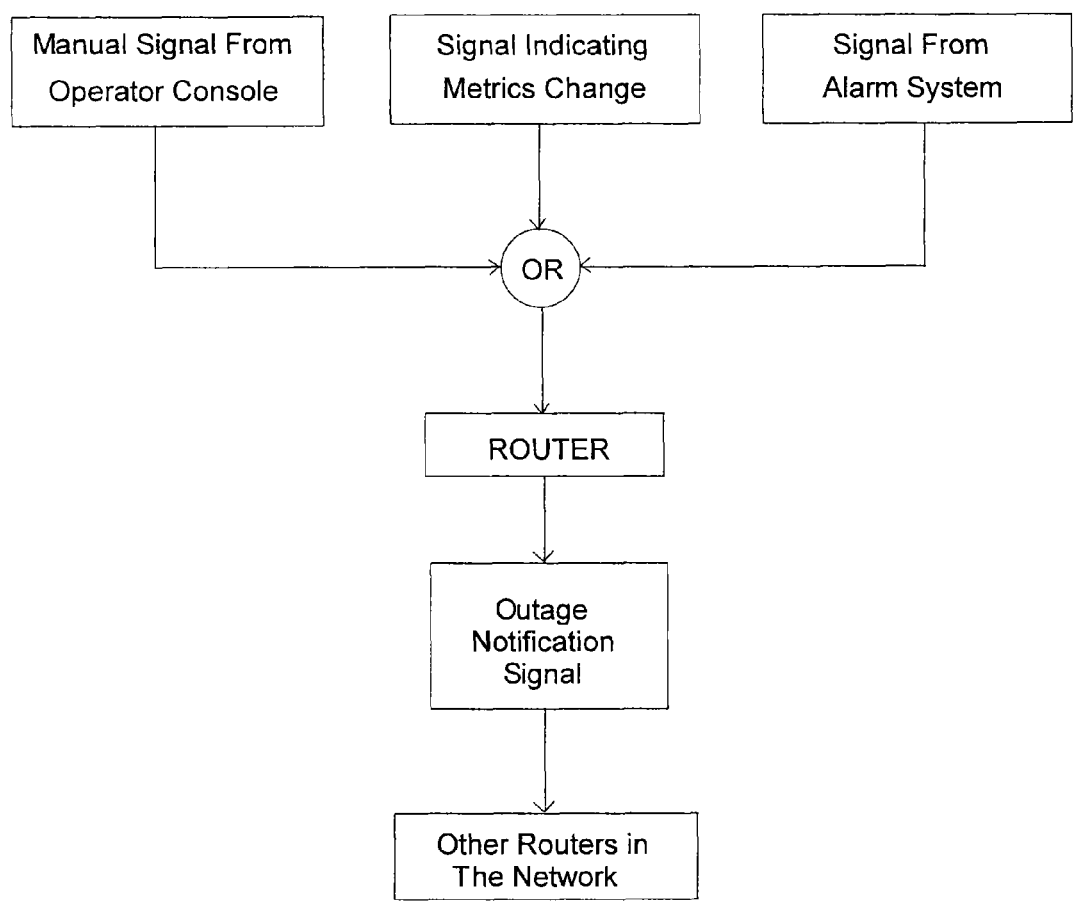
FIG. 2 is a flow chart showing the outage notification signal being sent from a router to the other routers in the network.

The actual mechanisms by which links or routers are taken off-line can vary. Often, the operator types a command on the router's console. It could also be done by turning off power to the router or by pulling out a card or the data cables to create an alarm condition. See FIG. 2. In the preferred method, a network operator types a command to a router designated for maintenance and schedules the outage. The designated router sends the announcement via OSPF, warning other nodes that selected links will not be available, so that the other routers can generate backup topology maps. At the scheduled time, the topology used by the network switches to the backup topology maps. The designated router then takes the selected link or links offline.

In a preferred embodiment of the present invention, the network includes a network operations center (NOC). The NOC is the physical space from which a typically large telecommunications network is managed, monitored and supervised. The NOC coordinates network troubles, provides problem management and router configuration services, manages network changes, monitors routers, switches, hubs and UPS systems that keep the network operating smoothly, manages the distribution and updating of software and coordinates with affiliated networks.

Typically, a router or other network element raises an alarm and sends a signal to the NOC, where engineers decide what to do and, in particular, decide when to take some device out of service. In a preferred embodiment, a device in a network is preprovisioned with a notion of maintenance windows (i.e., off-peak hours when maintenance can be most easily preformed without causing disruptions) and decides for itself that maintenance or repair is required soon, but not immediately. For example, modem disk drives can detect imminent failures. In one embodiment, the impending failure of a network component is detected by the NOC and the NOC schedules the outage for performing the repair. In another embodiment, the NOC schedules the outage for non-failure reasons, such as to upgrade components or to rearrange the components in the network.

In a preferred embodiment, the routers in the network are informed of the outage by a single router or group of routers, either on their own initiative (when an impending failure is detected) or on command from the NOC. This method is preferred because it is compatible with the routing protocols that are currently in use, i.e., the node/router that notices the failure broadcasts that fact. In another embodiment, the NOC sends a message to each router individually and informs them of the outage. This method is less efficient since it requires the NOC to send messages to hundreds of routers with the same command. However, the advantage is that the method doesn't require changes to the routing protocols, only to the routers.

During the interval between the announcement of a scheduled outage and the actual event, other topology changes may take place. For example, some other links or nodes may fail or may return to service. The routing map changes resulting from these events must be reflected in both the current routing map and the routing map prepared for the scheduled outage. Similarly, there may be more than one scheduled outage at any given time. A router should take into account all pending changes.

The method is not limited to scheduling outages in advance. In another embodiment of the present invention, the outage can be initiated manually by the operator. The operator can monitor the links in a router using the console and determine—from a message, from an outage schedule, or by checking the routing maps—that a link is idle. The operator can then manually enter the commands necessary to place the link in an outage mode. In a preferred embodiment of the present invention, a second message is sent out with advance warning of when the unavailable links will be reopened.

One of the embodiments of the present invention addresses scheduled outages of a link for maintenance. In some instances, there is advance warning that an interface card or a link is failing, and needs to be replaced or repaired. Conventional methods for doing this involve instructing a router to stop using the specified interface, and waiting until the routing protocols have reconverged. Because of delays and hysteresis deliberately built-in to the routing protocols, even this gentler scheme is noticeable to sensitive applications being transmitted over the network. The purpose of the built-in delays is to reduce the computational load on the routers because recalculating routing tables is expensive, and events are rarely singular. If the link from A to B is down, first A will announce it, and then B will announce the same thing. By delaying, the calculation, the router will incur the expense only once. Furthermore, some "outages" are transient, or even repetitive; a "flapping" link can put a heavy load on many routers if there are no compensating mechanisms.

The method of the present invention uses a "predicted outage" message when a link is going to be taken off-line. A router will send out a message to other routers saying that a given link will be down (or will have a different "cost" function) at a specified time in the future. In a preferred embodiment, each router in the system compares the time of the scheduled outage with the next scheduled updating of its routing tables. If the outage is scheduled to occur after the next scheduled updating of the routing tables, the router will wait and reconfigure the routing tables during the scheduled updating. After the usual delays, all of the routers will calculate the new routing table to be used at the specified time in the future. At the specified time, the routers will all switch to the new routing tables simultaneously. This simultaneous switching effectively reduces the outage to imperceptible levels.

There are a number of ways to synchronize the switch to different routes. The easiest is to use an absolute time. Most modern routers are capable of running Network Time Protocol (NTP), a standard time synchronization protocol, which can keep all of the routers' clocks within a few milliseconds of a standard time source. This technology is well known and is used in many systems; standard time sources include Global Positioning System (GPS) receivers and atomic clocks. In a preferred embodiment of the present invention, routers throughout the network can include in their rebroadcasts of the predicted outage message the delay introduced on that router. Such delays are due to inherent characteristics of the link, such as packet transmission time and signal propagation time across a wire-area link. Finally, routers that receive a predicted outage message can gradually poll the originating router, and find out its idea of when the outage will take place; this avoids the need for clock synchronization. There are many other mechanisms as well; the precise scheme is not central to the invention. For example, the predicted outage message can contain a relative time—"this link will shut down in 373 seconds"—rather than an absolute time.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

I claim:

1. A non-transitory computer-readable medium comprising instructions that, when executed by a processing device, cause the processing device to manage the routing of data packets across a plurality of routers in a network when a link is unavailable by:
    determining the connectivity of a plurality of nodes in the network, wherein the nodes are connected using a plurality of routers having a plurality of links between said routers, wherein data packets can be sent between nodes in the network via a plurality of paths, wherein each path passes through a different combination of routers and links and each router has a routing table which is recalculated at intervals using a routing protocol to provide the most efficient routing paths;
    informing a selected router that one or more of the links in the network will be unavailable at a specified time in the future;
    transmitting a message from the selected router containing information about the one or more links that will be unavailable at a specified time in the future;
    polling of the selected router by routers in the network in order to obtain additional information about the unavailability of the link or links at a specified time in the future; and
    recalculating the routing table in each router to determine the most efficient routing paths at the time in the future when one or more of the links in the network will be unavailable.

2. The computer-readable medium according to claim 1, further comprising synchronizing the time when a link will be unavailable using a standard time synchronization protocol.

3. The computer-readable medium according to claim 1, wherein the selected router is informed of the unavailability of one or more links in the network by an alarm signal.

4. The computer-readable medium according to claim 1, wherein the selected router is informed of the unavailability of one or more links in the network by a signal entered manually by an operator.

5. The computer-readable medium according to claim 1, wherein the message transmitted by the selected router relates to a metric change in the routing protocol.

6. The computer-readable medium according to claim 1, wherein the plurality of routers in the network switch to new routing tables at the same time.

7. The computer-readable medium according to claim 1, wherein the message is transmitted from the selected router to the other routers in the network.

8. The computer-readable medium according to claim 1, wherein the network comprises a network operations center and the message is transmitted from the selected router to the network operations center.

9. The computer-readable medium according to claim 8, wherein the network operations center selects the time when the routers are switched to the recalculated routing tables.

10. The computer-readable medium according to claim 1, further comprising repairing or performing maintenance work during the time in the future when one or more of the links will be unavailable.

11. The computer-readable medium according to claim 10, further comprising:
    informing the selected router that one or more of the links in the network will be available at a specified time in the future;
    transmitting a message from the selected router to the other routers in the network containing information about the one or more links that will be available at a specified time in the future;
    recalculating the routing table in each router to determine the most efficient routing paths at the time in the future when one or more of the links in the network will be available; and
    switching the plurality of routers in the network to Previously Presented routing tables at the same time.

12. A non-transitory computer-readable medium comprising instructions that, when executed by a processing device, cause the processing device to manage the routing of data packets across a plurality of routers in a network when a link is unavailable by:
    determining the connectivity of a plurality of nodes in the network, wherein the nodes are connected using a plurality of routers having a plurality of links between said routers, wherein data packets can be sent between nodes in the network via a plurality of paths, wherein each path passes through a different combination of routers and links and each router has a routing table which is recalculated at intervals using a routing protocol to provide the most efficient routing paths;

informing a selected router that one or more of the links in the network will be unavailable at a specified time in the future;

transmitting a message from the selected router containing information about the one or more links that will be unavailable at a specified time in the future;

synchronizing the time when a link will be unavailable using a standard time synchronization protocol;

polling of the selected router by other routers in the network in order to obtain additional information about the unavailability of the link or links;

recalculating the routing table in each router to determine the most efficient routing paths at the time in the future when one or more of the links in the network will be unavailable; and repairing or performing maintenance work during the time in the future when one or more of the links will be unavailable.

13. The computer-readable medium according to claim 12, wherein the selected router is informed of the unavailability of one or more links in the network by an alarm signal.

14. The computer-readable medium according to claim 12, wherein the selected router is informed of the unavailability of one or more links in the network by a signal entered manually by an operator.

15. The computer-readable medium according to claim 12, wherein the selected router is informed of the unavailability of one or more links in the network by a metric change in the routing protocol.

16. The computer-readable medium according to claim 12, wherein the plurality of routers in the network switch to Previously Presented routing tables at the same time.

17. The computer-readable medium according to claim 12, wherein the message is transmitted from the selected router to the other routers in the network.

18. The computer-readable medium according to claim 12, wherein the network comprises a network operations center and the message is transmitted from the selected router to the network operations center.

19. A system for managing the routing of data packets across a plurality of routers in a network when a link is unavailable, the system comprising a plurality of nodes in the network; a plurality of routers, wherein the routers are used for communications between the nodes, and wherein each router has a routing table which is recalculated at intervals using a routing protocol to provide the most efficient routing paths; a plurality of links between said routers;

a processing device for managing the routing of data packets across the plurality of routers in the network via a plurality of paths, wherein each path passes through a different combination of routers and links and wherein the processing device:

determines the connectivity of the plurality of nodes in the network; informs a selected router that one or more of the links in the network will be unavailable at a specified time in the future; transmits a message from the selected router containing information about the one or more links that will be unavailable at a specified time in the future;

wherein the selected router is polled by routers in the network in order to obtain additional information about the unavailability of the link or links at a specified time in the future; and the routing table in each router is recalculated to determine the most efficient routing paths at the time in the future when one or more of the links in the network will be unavailable.

20. The system for managing the routing of data packets across a plurality of routers in a network when a link is unavailable according to claim 19, the system further comprising a standard time synchronization protocol for synchronizing the time when a link will be unavailable.

* * * * *